(12) United States Patent
Lewis et al.

(10) Patent No.: US 7,356,469 B2
(45) Date of Patent: Apr. 8, 2008

(54) METHOD AND SYSTEM FOR TRIMMING AUDIO FILES

(75) Inventors: James R. Lewis, Delray Beach, FL (US); Catherine A. Longenberger, Hobe Sound, FL (US); David E. Reich, Jupiter, FL (US)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 10/922,760

(22) Filed: Aug. 20, 2004

(65) Prior Publication Data

US 2008/0007572 A1    Jan. 10, 2008

(51) Int. Cl.
*G10L 15/00* (2006.01)
(52) U.S. Cl. .................. 704/270; 704/275; 704/235
(58) Field of Classification Search ................ 704/270, 704/275, 235
See application file for complete search history.

(56) References Cited

U.S. PATENT DOCUMENTS

| 6,249,765 | B1 * | 6/2001 | Adler et al. ................. 704/500 |
| 6,260,011 | B1 * | 7/2001 | Heckerman et al. ........ 704/235 |
| 6,697,796 | B2 * | 2/2004 | Kermani ........................ 707/3 |
| 2002/0128906 | A1 | 9/2002 | Belth |
| 2003/0125945 | A1 | 7/2003 | Doyle |
| 2003/0223552 | A1 | 12/2003 | Schoeman |
| 2004/0083105 | A1 * | 4/2004 | Jaroker ....................... 704/260 |

* cited by examiner

*Primary Examiner*—Daniel Abede
(74) *Attorney, Agent, or Firm*—Akerman Senterfitt

(57) ABSTRACT

A system for automatically trimming an audio files based upon textual content associated with the audio file is provided. The source of the textual content may be an electronic document or written language text. The textual content may include predefined hints, a text mark, or end-of-phrase punctuation mark. The system generates a trimming instruction based upon textual content corresponding to the audio file, and the audio file is trimmed based upon the trimming instruction.

7 Claims, 2 Drawing Sheets

METHOD AND SYSTEM FOR TRIMMING AUDIO FILES

BACKGROUND

1. Field of the Invention

The present invention is directed to electronic file processing, and, more particularly, to electronic audio file processing.

2. Background of the Invention

Speech is increasingly the user interface of choice for e-commerce and many other types of data exchange over data communication networks such as the Internet. Accordingly, many audio files are being produced for use in conjunction with Interactive Voice Response (IVR) Systems. Such files can be incorporated into dialogs using software tools like Voice Extensible Markup Language (VoiceXML), or other audio-based markup languages. While audio can be generated synthetically, i.e. using text-to-speech technology, another common way of producing audio files for use in dialogs is to record speech from a speaker reading a script aloud.

A common practice in producing audio for use in an IVR System is to create audio files that contain long periods of silence both before and after the corresponding voice recording. It is also a common practice to deal with such long periods of silence in an audio file by trimming the file.

The needed effort for producing audio files has been reduced somewhat by a producer's being able to trim such a file automatically using conventional methods and systems. To date, however, there does not appear to have been any attempt to trim audio files with reference to the silences, pauses, and delays associated with typical human speech patterns. Whereas textual communication conveys via punctuation marks some of the natural patterns of speech, conventional audio trimming treats all inter-phrase intervals alike.

Failure to distinguish between the silence that follows a comma, for example, from that which follows a period, colon, or semi-colon can make phrase splicing problematic. Current devices and methods may automatically trim or synchronize audio and text files, but none appear to address trimming of audio files based on the their underlying textual content. Moreover, whereas there appears not to have been any recognition of this problem nor any attempt to ameliorate it, there similarly appears not to have been any attempt to devise a way to automatically trim an audio file in accordance with its underlying textual content in real-time.

SUMMARY OF THE INVENTION

The invention is directed to a system and related methods for automatically trimming an audio file based upon textual content associated with the audio file. The source of the textual content may be an electronic document or written language text. The textual content may include a hint in the form of imbedded subcode, a text mark, or end-of-phrase punctuation mark.

The system may include a trimming module for generating a trimming instruction based upon the textual content. The system further may include an audio processor for trimming the audio file based upon the trimming instruction.

A method for trimming an audio file according to the invention may include generating a trimming instruction based upon textual content corresponding to the audio file, and trimming the audio file based upon the trimming instruction. The textual content may include at least two distinct text marks. Generating a trimming instruction may include generating a first trimming instruction in response to one distinct text mark and generating a second trimming instruction in response to another distinct text mark. Accordingly, the method includes trimming the audio file by a first amount in response to the first trimming instruction, and trimming the audio file by a second amount in response to the second trimming instruction.

The amounts by which different audio files are automatically trimmed according to the invention may be variable parameters that are determined by a method user. Alternatively, the parameters may be set by default. Generating a trimming instruction and automatically trimming an audio file in response thereto, moreover, may be done in real-time.

Another embodiment of the present invention can include a machine readable storage programmed for causing a machine to perform the various steps disclosed herein.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF PREFERRED EMBODIMENTS

Figure 1:
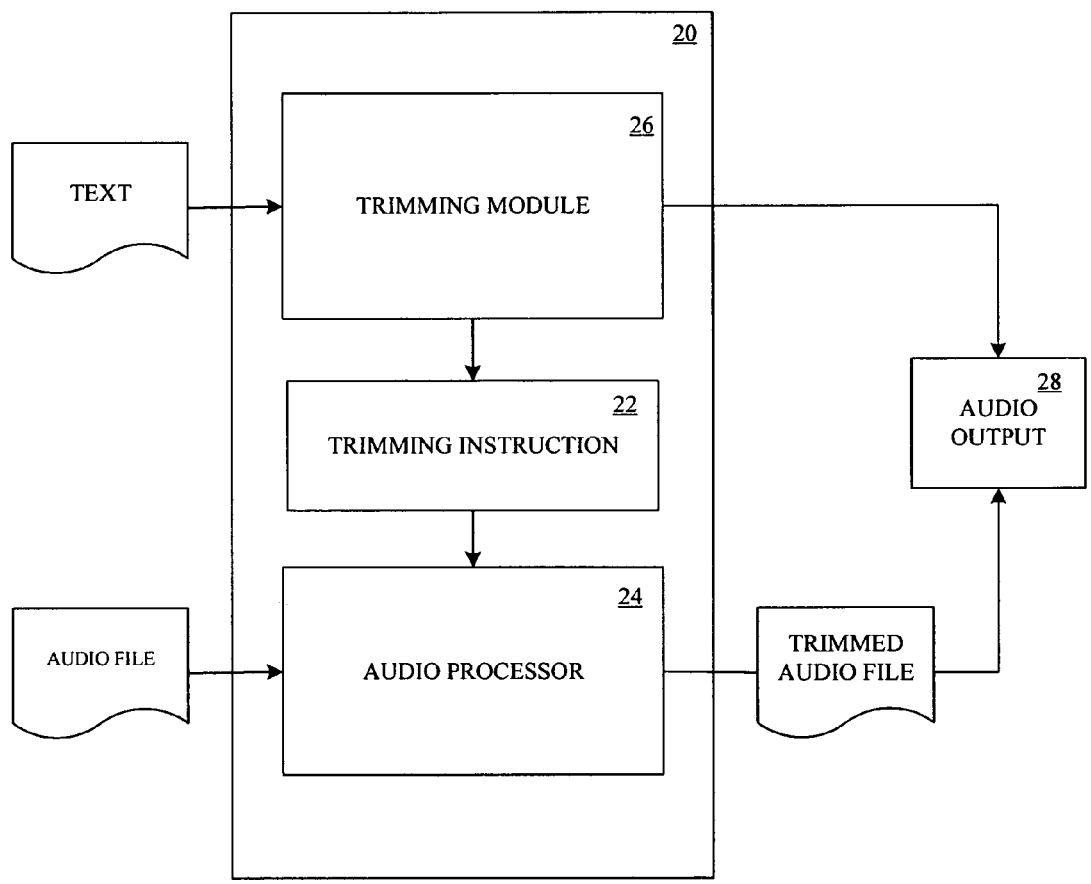
FIG. 1 is schematic diagram of a system for trimming audio files according to one embodiment of the invention.

FIG. 1 schematically illustrates a system 20 for trimming audio files according to one embodiment of the invention. The system 20 illustratively includes a trimming module 26 that generates a trimming instruction 22 based upon textual content associated with an audio file, and an audio processor 24 that trims the audio file based upon the trimming instruction 22.

The textual content that is used by the trimming module 26 to generate a trimming instruction 22 can be supplied by a variety of sources. For example, the textual content can be supplied in the form of hints imbedded as subcode in a program written in a known standardized code, such as a VoiceXML file. When the file is processed by, for example, a browser, the imbedded subcode causes the audio processor 24 to process the audio files corresponding to the VoiceXML file in the manner specified by its textual content in the form of programmer-supplied hints.

Accordingly, the audio files specified by a VoiceXML file can be rendered in a form that more closely mimics the natural phrasing of human speech. For example, a VoiceXML or other markup language file may require that several audio segments stored as audio files be spliced together in making the audio presentation. It may be that three such audio segments correspond to what in written language would be a phrase followed by a comma, followed by a second phrase ending with a period, followed by a third sentence ending with a period. Accordingly, the programmer of the underlying VoiceXML file that is supplied to the browser will have imbedded appropriate hints as subcode along with the standard VoiceXML code.

Specifically, a first hint would cause the trimming module 26 to direct the audio processor 24 to trim the first audio file by a first amount, such as 250 milliseconds. A second hint would cause the trimming module 26 to direct the audio processor 24 to trim the second audio file by a second amount greater than the first, such as 500 milliseconds. Accordingly, when spliced together, the first two audio files are appropriately trimmed by the system 20 so that they are separated by a smaller amount of silence, reflecting the slight pause associated with a comma separation in natural speech. The second and third audio files are trimmed by the system 20 to have a longer silence separating their audio rendition corresponding to the longer pause of natural speech separating two distinct sentences as indicated by detection of the period ending each phrase or sentence.

According to one embodiment, a system user can either actively set the parameter values or instead accept default silences based on the class of the particular final-phrase punctuation. For example, classes can include no punctuation, semi-final corresponding to commas, semi-colons, and the like, and final corresponding to periods, question marks, exclamation points, etc. It follows that the amounts by which different audio files are trimmed are variable parameters that may be predefined and determined by a user so as to automatically trim audio files by different amounts in accordance with the end-of-phrase punctuation of the text associated with each audio file. Thus, a user can set different values for each type of end-of-phrase punctuation. For example, 250 milliseconds may be set for commas, 300 milliseconds for semi-colons, and 500 milliseconds for periods.

It will be readily apparent to those of ordinary skill in the art, that other permutations and combinations of trimming audio files can also be accomplished by the system 20. Moreover, the system 20 illustrated in this example can in other circumstances alternately trim the beginning, ending, or both portions of a particular audio file according to the particular phrasing or speech pattern that a system user wishes to achieve.

It will be readily apparent to those of ordinary skill in the art that the either or both the trimming module 26 and the audio processor 24 of the system 20 can be implemented as software configured to run on various platforms, including the IBM WebSphere® Voice Server available from International Business Machines Corporation of Armonk, N.Y. Alternately, as will be also be appreciated by those of ordinary skill in the art, one or both of the trimming module 26 and the audio processor 24 can be implemented as dedicated circuits using logic gates, memory, and other known processing components.

The system 20 allows for automated trimming of one or more audio files based upon corresponding textual content in a pre-processing stage. In another embodiment, however, the inventive arrangements disclosed herein can be implemented to function in a real-time processing environment.

In an alternate embodiment, the source of textual content used by the system 20 in trimming an audio file is the alternate (alt) text of a VoiceXML file or other file written in a markup language having text-to-speech coding. That is, the alternate text can include a transcript, including punctuation, of the audio being played. Thus, according to this embodiment, the trimming module 26 can function as a parser/marker for recognizing and distinguishing punctuation marks in the alternate text that corresponds to an audio file as specified within a markup language file. Accordingly, the trimming module 26 illustratively generates trimming instructions 22 based on the particular end-of-phrase mark contained in the particular textual content associated with the audio file. Accordingly, the system 20 is able to trim an audio file based on its textual content even if the file does not contain hints imbedded as subcode along with the standard code.

For example, a VoiceXML or other TTS markup language file could be part of an automated phone reservation system for an auto rental. A phone caller is able to call in to reserve a rental automobile. The automated transaction would likely involve a series of recorded audio segments to which the customer makes responses and receives various information. When the caller first contacts the automated reservation system, the caller might hear "thank you for calling Smith and Jones Auto Rental." A subsequently rendered audio file might contain a question for the caller, such as "what date and time would you like to reserve for picking up your vehicle?" or "where would you like: to pickup your vehicle?" A final response to the caller could be "your vehicle will be ready," at which point the audio segment ends and is followed by an inserted data or time.

In this example, the first audio file requires trimming that corresponds to a silence appropriate for a sentence ending with a period. Likewise, the second audio file requires trimming for silence appropriate to a sentence ending with a question mark. The final audio file, however, needs no prolonged pause because natural speech would dictate that the inserted date and time follow closely after the last word of the segment. Thus, according to this embodiment, the system 20 trims in real-time audio files whose corresponding textual content is alternate text.

In yet another embodiment, the system 20 responds to an absence of hints in the textual content by looking to the alternate-text that can be extracted from the source code of a document written in a programming language such as VoiceXML or other suitable markup language. Thus, according to this embodiment, the system is able to trim an audio file on the basis of hints imbedded as subcode, or, instead, on the basis of alternate-text contained in the file.

According to yet another embodiment, the source of textual content for an audio file is a standard language text such as text read into a teleprompter program. Other examples of standard language textual sources include scripts such as are commonly utilized when pre-recording audio segments. In this embodiment, audio files can be associated with corresponding transcripts. The audio files and transcripts can be loaded into the system 20 as needed. The trimming module 26 recognizes and distinguishes the standard language text punctuation mark such as a comma, period, or other end-of-phrase mark. Based on the particular end-of-phrase mark, the trimming module 26 generates a trimming instruction. The audio processor 24 trims the corresponding audio file based on the trimming instruction.

Standard language text can be used, for example, in connection with prerecorded audio files in which a professional actor reads the text. Current devices and methods trim the beginning and ending of the audio file automatically by a preset amount. The system 20 of the present invention, however, allows such audio files to be trimmed on the basis of the textual content of the script. Thus, a recorded segment which ends with an end of sentence phrase is trimmed differently than one ending, for example, with a comma or no punctuation at all. Again, this permits different audio files to be spliced together while automatically achieving the pauses and silences that more closely resemble natural speech.

It should be appreciated that the present invention further can be used in the context of text-to-speech. That is, the present invention can be used to analyze the text of prompts as specified in a voice markup language document for punctuation. The audio received from a text-to-speech system then can be trimmed as disclosed herein.

As the above examples make clear, regardless of the source of textual content, the various embodiments of the system 20 enable the trimming of an audio file on the basis of the textual content. Moreover, with respect to the first two sources of textual data described above, the trimming module 26 optionally can serve the additional function of ascertaining whether a particular received file contains hints or alternate text that necessitate trimming. If not, the system 20 passes the file directly to an audio output 28, which produces the physical rendering of the audio presentation for that particular file. Otherwise, the system 20 trims the audio file in the manner already described before passing a trimmed audio file to the audio output 28.

Figure 2:
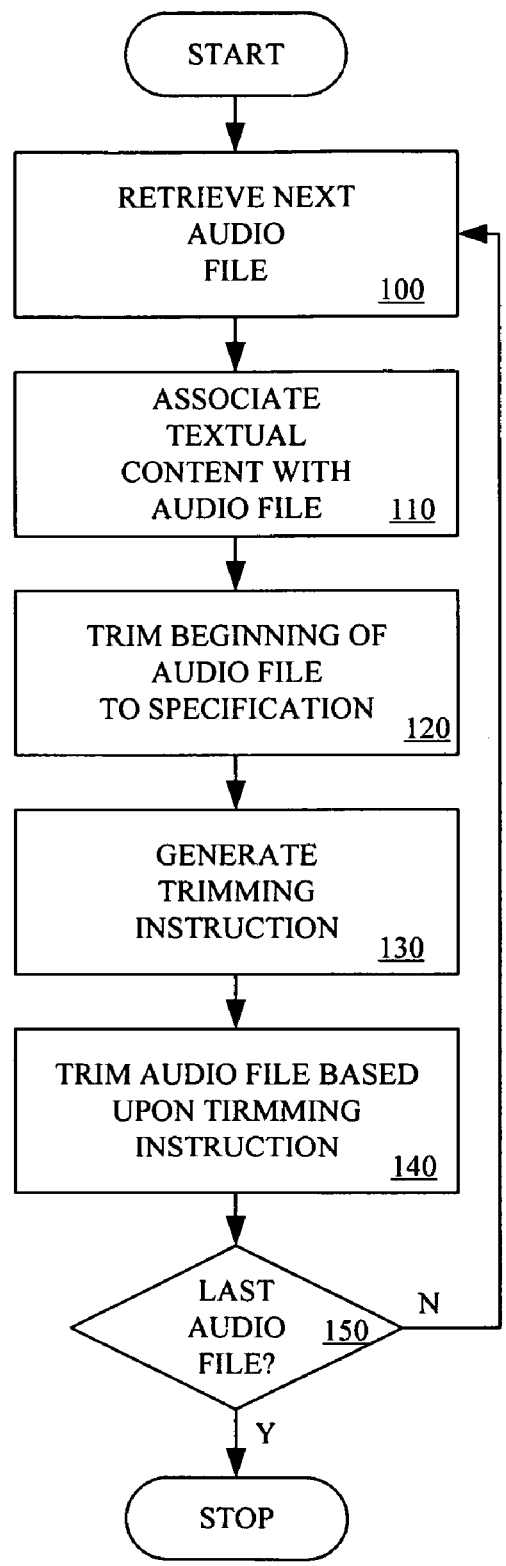
FIG. 2 is a flow chart illustrating a method of trimming audio files according to another embodiment of the invention.

FIG. 2 provides a flow chart illustrating a method of trimming audio files according to another embodiment of the present invention. In step 100, an audio file is retrieved and matched with its corresponding textual content in step 110. As noted, the associated textual content can be the VoiceXML document itself, for example where alternate text specifying a transcript of the audio file is specified, a hint, imbedded subcode in the VoiceXML document, or the actual text of a prompt to be generated using text-to-speech technology. Still, as noted, the text can be a file that is distinct from, but associated with, the audio file. In that case, the file also can specify a transcript of the audio file. Accordingly, it should be appreciated that the present invention also can include an optional step of determining whether the markup language document includes a hint, alternate text, or whether an associated transcript file has been associated with the audio file.

In any case, the beginning of the audio file is illustratively trimmed by default in step 120. As already noted above, however, the beginning of the audio file alternatively may be trimmed according to an instruction based upon the textual content associated with the audio file. A trimming instruction based upon the textual content associated with the audio file is generated in step 130. The end of the audio file is trimmed in step 140 in accordance with the trimming instruction.

The method optionally includes additional steps for trimming a multiplicity of distinct audio files, each such file having a unique textual content associated with it. Thus, in optional step 150, a determination can be made as to whether any further audio files are to be processed. If not the procedure ends. Otherwise the method loops back to step 100 and repeats as necessary. Accordingly, the next audio file is retrieved, and the procedure is repeated until each of the distinct audio files has been trimmed according to the specifications dictated by the associated textual content. The permits analyzes the textual content of audio files to trim those files such that the aggregation, or playing, of multiple audio files sounds more like natural human speech. As noted, files can be processed in real-time or processed in batch. The extent to which the audio file is trimmed may be a variable parameter set by a method user, or, in lieu of an affirmative user selection, by default.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method for trimming an audio file, the method comprising:

generating a first and a second trimming instruction based upon textual content corresponding to the audio file, wherein the textual content comprises at least two distinct text marks, and wherein the first trimming instruction is generated in response to one of the at least two distinct text marks and the second trimming instruction is generated in response to the other of the at least two distinct text marks; and trimming the audio file based upon the trimming instruction.

2. The method of claim 1, wherein the step of trimming the audio file comprises trimming the audio file by a first amount in response to the first trimming instruction, and trimming the audio file by a second amount in response to the second trimming instruction.

3. The method of claim 2, wherein the first and second amounts comprise first and second variable parameters, respectively, and wherein the method further comprises the step of determining values for the first and second variable parameters.

4. The method of claim 1, wherein the steps of generating the trimming instruction and trimming the audio file are performed in real-time.

5. The method of claim 1, wherein the textual content includes at least one predefined hint, and wherein the step of generating the trimming instruction comprises generating the trimming instruction based upon the hint.

6. The method of claim 1, wherein the textual content is contained in a file supplied to a voice server connected to a data communication network and having a plurality of stored audio files.

7. The method of claim 6, wherein the audio file comprises a plurality of distinct audio files; and wherein the method further comprises the step of associating textual content with each of the plurality of distinct audio files.

* * * * *